March 20, 1945. R. KINGSINGER ET AL 2,372,004
SCREW MACHINE
Filed Aug. 3, 1942    2 Sheets-Sheet 2
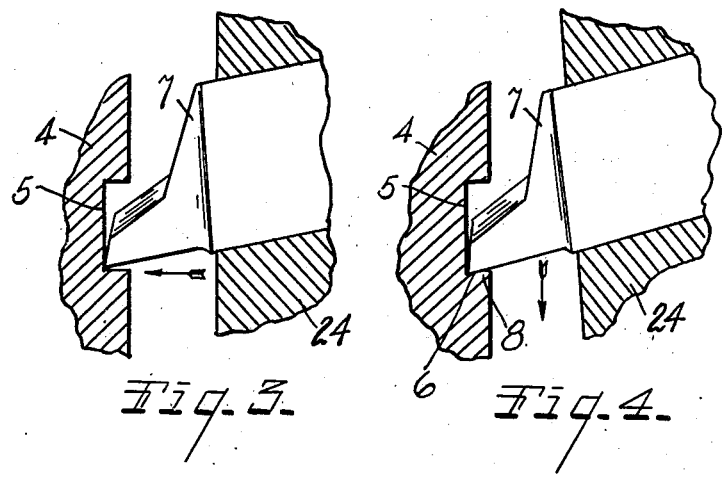
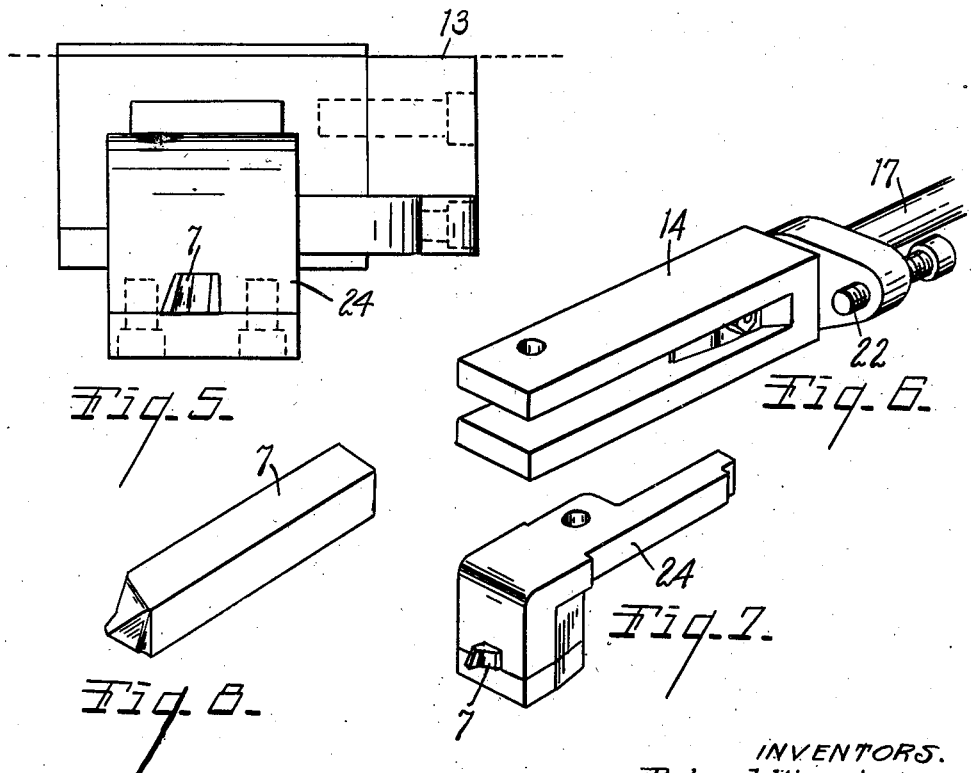
INVENTORS.
Roland Kingsinger
George Pinkham
William Friegel
BY
Earl D Chappell Patented Mar. 20, 1945

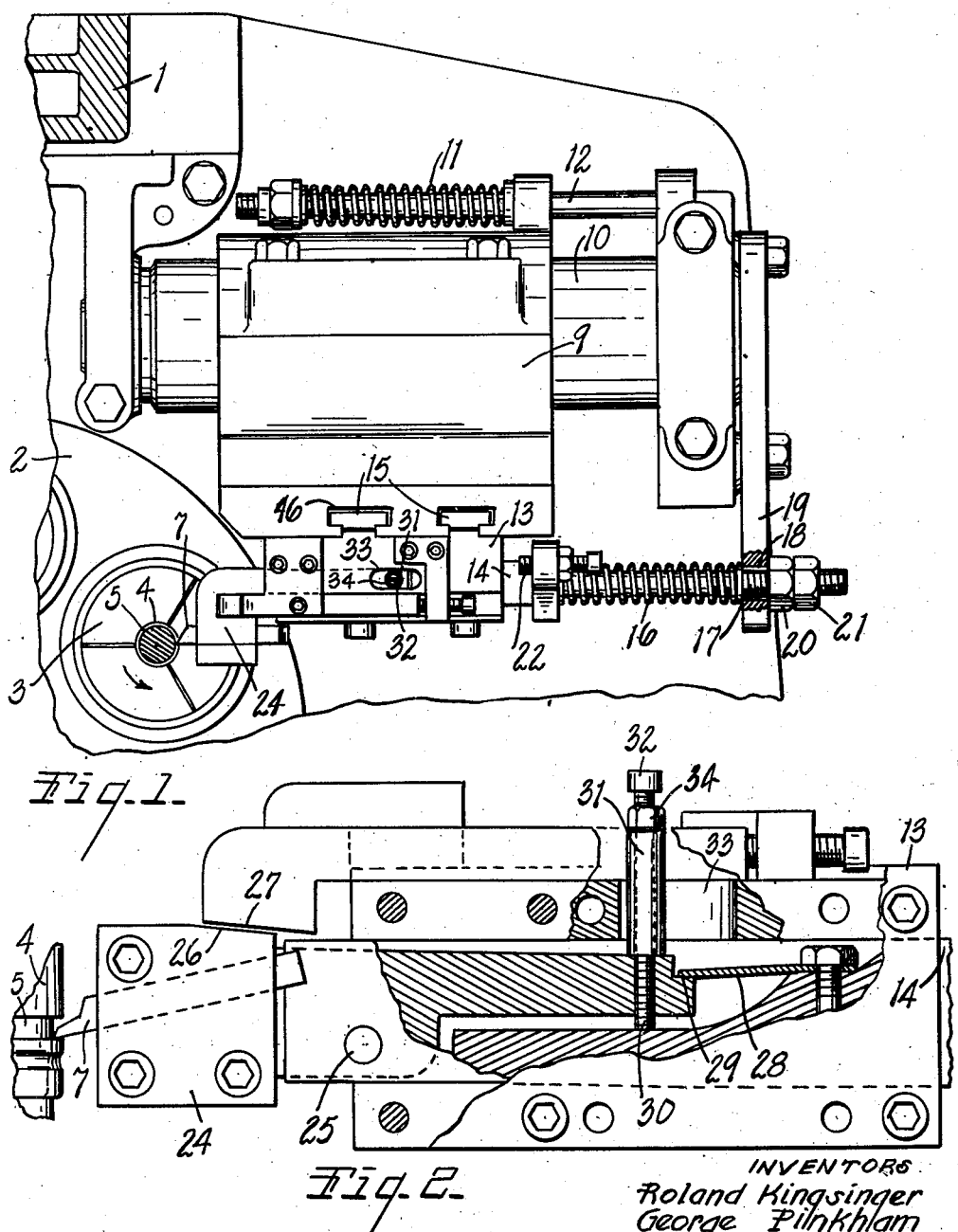

2,372,004

UNITED STATES PATENT OFFICE 2,372,004

SCREW MACHINE

Roland Kingsinger, George Pinkham, and William Friegel, Detroit, Mich., assignors to L. A. Young Spring and Wire Corporation, Detroit, Mich., a corporation of Michigan Application August 3, 1942, Serial No. 453,338

12 Claims. (Cl. 82—24)

The main objects of this invention are:

First, to provide a screw machine for forming undercuts on work which permits the use of a simple tool and one which may be ground by a mechanic of average skill.

Second, to provide a screw machine which if of very large capacity and well adapted for the undercutting of grooves in shells to adapt the grooves to receive rifling bands or collars.

Third, to provide a screw machine designed for this purpose in which the tools are retracted from the work in such manner as not to damage the tool or the work.

Fourth, to provide a screw machine having these advantages which is largely automatic in its operation and may be accurately and easily adjusted to particular work.

Objects relating to details and economies of the invention will appear from the description to follow. The invention is defined in the claims.

A machine which embodies the features of the invention is clearly illustrated in the accompanying drawings, in which:

Fig. 1 is a fragmentary view partially in section of a turret type of screw machine embodying the features of this invention, only such portions of the machine being illustrated as are directly related to this embodiment.

Fig. 2 is an enlarged bottom view partially in section showing various details of the tool slide and tool holder and the relationship of the operating or actuating cam thereto.

Fig. 3 is an enlarged fragmentary view partially in section illustrating the position of the tool as initially presented to the work.

Fig. 4 is an enlarged fragmentary view partially in section illustrating the tool in its cutting relation to the work.

Fig. 5 is a fragmentary front end elevation of the tool holder and certain of its supporting and cooperating parts.

Fig. 6 is a perspective view of the tool slide.

Fig. 7 is a perspective view of the tool holder with the tool mounted therein.

Fig. 8 is an inverted perspective view of the tool or cutter.

In the accompanying drawings we have illustrated only such parts of a screw machine as seem pertinent to an understanding of the invention and to illustrate an embodiment thereof in a well-known type of lathe.

In the drawings 1 represents the frame of the machine and 2 the turret which is provided with a plurality of live spindles provided with chucks designated generally by the numeral 3. The work is indicated at 4. This work is a shell having an annular groove 5 therein adapted to receive a rifling band or collar of metal softer than the shell and projecting somewhat beyond the shell so that when fired the rifling grooves are automatically cut in this band by the rifling of the gun barrel. These shells are initially formed with the annular groove 5 therein having parallel sides. It is desirable to undercut one of these sides as shown at 6, Fig. 4, the undercut being for the purpose of providing an anchoring means for the rifling band or collar when it is rolled or compressed into the groove. This undercutting has been done on previous screw machines but the tools by which it has been performed have been expensive to produce and require complicated grinding steps beyond the skill of the average tool grinding mechanic, requiring special skill and special stock. One of the advantages of this invention is to permit the use of commonly used bar stock of rectangular section as shown in the body portion of the tool 7. The cutting edge 8 of the tool is straight and the clearance cuts are simply and easily ground.

The carriage 9 is mounted on a slide member 10 for reciprocating movement, the spring 11 on rod 12 acting to retract the carriage and urge it against the actuating cam which is not shown. It will be understood that any actuating cam suitable for the particular work may be used. The carriage is provided with a support 13 for the tool holder slide 14. The support 13 is mounted for transverse adjustment on the carriage 9 by means of the clamps 15 engageable in the slots 46 of the carriage.

The slide 14 has a lost motion connection to the carriage and is urged on its forward stroke by the coiled spring 16 disposed on the threaded rod 17 arranged through a hole 18 on the arm or bracket 19. This threaded rod 18 has an adjusting nut 20 and a lock nut 21 so that the forward movement of the tool slide may be accurately gaged or adjusted. The slide is provided with an adjustable tappet 22 with which the carriage support or slideway member 13 is engageable on the return stroke of the carriage, thus retracting the tool holder slide after a retracting movement of the carriage.

The tool holder 24 is pivotally mounted on the tool slide 14 which is formed to receive the shank portion of the tool holder (see Figs. 6 and 7). The tool holder pivot 25 is disposed transversely to the axis of the live spindle so that the tool holder swings in a plane parallel to the axis of the work. This tool holder is provided with a cam surface 26 which is engaged by the cam 27 on the carriage 9 as the carriage approaches the end of its forward stroke, thereby swinging the tool holder on its pivot. The lost motion connection for the carriage to the tool slide permits the spring 16 to advance the tool 7 into the groove to be undercut before the carriage reaches the end of its forward stroke so that as the carriage completes its forward stroke the tool holder is actuated on its pivot to feed the tool to the work with a swinging movement, thereby forming the undercut 6. This forward movement is against the tension of the blade spring 28 which is mounted on the tool slide to engage the tail end of the tool holder, stepped at 29 to receive the same.

The tool holder is provided with an adjustable stop 30 for limiting its retracting movement. This stop is in the form of a screw, a spacer 31 being arranged on the screw so that the head 32 of the screw is readily accessible. The stop screw is arranged through a slot 33 and lock nut 34 holds the stop in its adjusted position.

With the parts thus arranged the tool slide, as stated, is advanced by the spring 16 to its forward position, being determined by the stop means described. This is permitted when the carriage has advanced sufficiently to leave the tappet 22. Continued movement of the carriage brings the cam 27 into operative position to swing the tool holder on its pivot and thus effect the undercut. The retracting movement is as described.

The tool is preferably disposed on its holder in a forwardly inclined position as that permits the use of a tool with a substantially straight cutting edge. The pivot 25 is positioned so that the tip of the tool lies in a plane through the pivot 25 and substantially at right angles to the axis of the work. This makes it possible to advance the tool straight into the groove to be undercut and the retraction of the tool with a swinging movement without injury to the tip of the tool or to the work. In other words, the tool on its retracting movement completely clears the work.

We have illustrated and described our invention in an embodiment thereof especially designed for undercutting grooves in shells but there are various embodiments of the invention which we contemplate and which are of advantage. It is believed this disclosure will enable those skilled in the art to embody and adapt our invention as may be required for particular work. However, it is especially desirable for work where undercutting is required.

Having thus described our invention what we claim as new and desire to secure by Letters Patent is:

1. In a screw machine, the combination with a driven work spindle and a tool carriage mounted for travel in a path transverse to the axis of the spindle, of a tool slide mounted on said carriage for movement in a path parallel with the path of travel of the carriage, a spring acting to urge said tool slide toward the work, means for adjustably limiting the forward movement of the tool slide under the action of the spring, an adjustable tappet on said slide with which the carriage coacts on its return stroke to retract the tool slide, a tool holder pivotally mounted on said tool slide for swinging movement in a plane parallel to the axis of the work, an undercutting tool mounted on said tool holder in a forwardly inclined relation to the path of reciprocation of the tool slide, said tool having a substantially straight cutting edge and being positioned so that its tip is approximately in a plane passing through the axis of the tool holder pivot and substantially at right angles to the axis of the work, a spring on said tool slide acting to retract said tool holder on its pivot, an adjustable stop for limiting the retracting movement of said tool holder under the action of its said retracting spring, and a feed cam on said carriage coacting with said tool holder to swing it on its pivot and thereby feed the tool to the work as the tool carriage is advanced, the retraction of the cam on the return stroke of the carriage permitting said tool holder retracting spring to swing the tool holder on its pivot and thereby clear the undercut of the work.

2. In a screw machine, the combination with a driven work spindle and a tool carriage mounted for travel in a path transverse to the axis of the spindle, of a tool slide mounted on said carriage for movement in a path parallel with the path of travel of the carriage, a spring acting to urge said tool slide toward the work, means for limiting the forward movement of the tool slide under the action of said spring, means on said slide with which said carriage coacts on its return stroke to retract the tool slide, a tool holder pivotally mounted on said tool slide for swinging movement in a plane parallel to the axis of the work, an undercutting tool mounted on said tool holder in a forwardly inclined relation to the path of reciprocation of the tool slide, said tool having a substantially straight cutting edge and being positioned so that its tip is approximately in a plane passing through the axis of the tool holder pivot and substantially at right angles to the axis of the work, a spring on said tool slide acting to retract said tool holder on its pivot, and a feed cam on said carriage coacting with said tool holder to swing it on its pivot and thereby feed the tool to the work as the tool carriage is advanced, the retraction of the cam on the return stroke of the carriage permitting said tool holder retracting spring to swing the tool holder on its pivot and thereby clear the undercut of the work, 3. In a screw machine, the combination with a driven work spindle and a tool carriage mounted for travel in a path transverse to the axis of the spindle, of a tool slide mounted on said carriage for movement in a path parallel with the path of travel of the carriage, a spring acting to urge said tool slide toward the work, means for adjustably limiting the forward movement of the tool slide under the action of said spring, an adjustable tappet on said slide with which the carriage coacts on its return stroke to retract the tool slide, a tool holder pivotally mounted on said tool slide for swinging movement in a plane parallel to the axis of the work, an undercutting tool mounted on said tool holder in a forwardly inclined relation to the path of reciprocation of the tool slide, a spring on said tool slide acting to retract said tool holder on its pivot, an adjustable stop for limiting the retracting movement of said tool holder under the action of its said retracting spring, and a feed cam on said carriage coacting with said tool holder to swing it on its pivot and thereby feed the tool to the work as the tool carriage is advanced, the retraction of the cam on the return stroke of the carriage permitting said tool holder retracting spring to swing the tool holder on its pivot and thereby clear the undercut of the work.

4. In a screw machine, the combination with a driven work spindle and a tool carriage mounted for travel in a path transverse to the axis of the spindle, of a tool slide mounted on said carriage for movement in a path parallel with the path of travel of the carriage, a spring acting to urge said tool slide toward the work, means for limiting the forward movement of the tool slide under the action of said spring, means on said slide with which the carriage coacts on its return stroke to retract the tool slide, a tool holder pivotally mounted on said tool slide for swinging movement in a plane parallel to the axis of the work, an undercutting tool mounted on said tool holder in a forwardly inclined relation to the path of reciprocation of the tool slide, a spring on said tool slide acting to retract said tool holder on its pivot, and a feed cam on said carriage coacting with said tool holder to swing it on its pivot and thereby feed the tool to the work as the tool carriage is advanced, the retraction of the cam on the return stroke of the carriage permitting said tool holder retracting spring to swing the tool holder on its pivot and thereby clear the undercut of the work.

5. In a machine of the class described, the combination of a driven work spindle, a tool carriage, a tool slide slidably mounted on said carriage for movement to and from the work and having a lost motion connection with said carriage, a spring acting to urge said tool slide toward the work, means for adjustably limiting the forward movement of the tool slide, a tool holder pivotally mounted on said tool slide for swinging movement in a plane parallel to the axis of the work, a tool positioned so that its tip is approximately in a plane passing through the axis of the tool holder pivot, such plane being parallel to the path of travel of the tool carriage and substantially at right angles to the axis of the work, cam means coacting with said tool holder to swing it on its pivot after the tool slide has reached the end of its forward stroke and thereby swingingly feed said tool to the work, a spring carried by said tool slide and acting in opposition to said cam means to retract said tool holder on its pivot prior to the retracting movement of the slide, and an adjustable stop for limiting the retracting movement of said tool holder on its pivot under the action of its retracting spring.

6. In a machine of the class described, the combination of a driven work spindle, a tool carriage, a tool slide slidably mounted on said carriage for movement to and from the work and having a lost motion connection with said carriage, a tool holder pivotally mounted on said tool slide for swinging movement in a plane parallel to the axis of the work, a tool positioned so that its tip is approximately in a plane passing through the axis of the tool holder pivot, such plane being parallel to the path of travel of the tool carriage and substantially at right angles to the axis of the work, means coacting with said tool holder to swing it on its pivot after the tool slide has reached the end of its forward stroke and thereby swingingly feed said tool to the work and means for swinging said tool holder on its pivot prior to the retracting movement of the slide.

7. In a machine of the class described, the combination of a driven work spindle, a tool carriage, a tool slide slidably mounted on said carriage for movement to and from the work and having a lost motion connection with said carriage, a tool holder pivotally mounted on said tool slide for swinging movement in a plane parallel to the axis of the work, a tool having a substantially straight cutting edge and being positioned so that its tip is approximately in a plane passing through the axis of the tool holder pivot, such plane being parallel to the path of travel of the tool carriage and substantially at right angles to the axis of the work, cam means coacting with said tool holder to swing it on its pivot after the tool slide has reached the end of its forward stroke and thereby swingingly feed said tool to the work, and a spring carried by said tool slide and acting in opposition to said cam means to retract said tool holder on its pivot prior to the retracting movement of the slide.

8. In a machine of the class described, the combination of a driven work spindle, a tool carriage, a tool slide slidably mounted on said carriage for movement to and from the work and having a lost motion connection with said carriage, a tool holder pivotally mounted on said tool slide for swinging movement in a plane parallel to the axis of the work, a tool having a substantially straight cutting edge and being positioned so that its tip is approximately in a plane passing through the axis of the tool holder pivot, such plane being parallel to the path of travel of the tool carriage and substantially at right angles to the axis of the work, means coacting with said tool holder to swing it on its pivot after the tool slide has reached the end of its forward stroke and thereby swingingly feed said tool to the work and means for swinging said tool holder on its pivot prior to the retracting movement of the slide.

9. In a machine of the class described, the combination with a driven work spindle and a tool carriage operatively associated therewith, a tool slide mounted on said tool carriage and having a lost motion connection therewith, a tool holder pivotally mounted on said tool slide, said carriage being provided with a cam for actuating said tool holder on its pivot during the completion of the work stroke of the carriage, the lost motion connection for the carriage to the slide permitting the retraction of said cam prior to the retraction of the tool slide, means for swingingly retracting said tool holder on its pivot during the initial retracting movement of said tool carriage, and an undercutting tool having a substantially straight cutting edge mounted on said tool holder in a forwardly inclined angular relation to the path of travel of the tool slide, the tip of said tool being positioned relative to the pivot axis of said tool holder so that the tool clears the work on the swinging retracting movement of the tool holder.

10. In a machine of the class described, the combination with a driven work spindle and a tool carriage operatively associated therewith, a tool slide mounted on said tool carriage and having a lost motion connection therewith, a tool holder pivotally mounted on said tool slide, said carriage being provided with a cam for actuating said tool holder on its pivot during the completion of the work stroke of the carriage, the lost motion connection for the carriage to the slide permitting the retraction of said cam prior to the retraction of the work tool slide, means for swingingly retracting said tool holder on its pivot during the initial retracting movement of said tool carriage, and an undercutting tool mounted on said tool holder, the tip of said tool being positioned relative to the pivot axis of said tool holder so that the tool clears the work on the swinging retracting movement of the tool holder.

11. In a machine of the class described, the combination with a driven work spindle and a tool carriage operatively associated therewith, a tool slide mounted on said tool carriage and having a lost motion connection therewith, a tool holder pivotally mounted on said tool slide, said carriage being provided with a cam for actuating said tool holder on its pivot during the completion of the work stroke of the carriage, the lost motion connection for the carriage to the slide permitting the retraction of said cam prior to the retraction of the tool slide, and means for swingingly retracting said tool holder on its pivot during the initial retracting movement of said tool carriage.

12. In a machine of the class described, the combination with a driven work spindle and a tool carriage operatively associated therewith, a tool slide mounted on said tool carriage and having a lost motion connection therewith, a spring acting to position the slide in cutting position prior to the completion of the work stroke of the carriage, a tool holder pivotally mounted on said tool slide, said carriage being provided with a cam for actuating said tool holder on its pivot during the completion of the work stroke of the carriage, the lost motion connection for the carriage to the slide permitting the retraction of said cam prior to the retraction of the tool slide, and means for swingingly retracting said tool holder on its pivot during the initial retracting movement of said tool carriage.

ROLAND KINGSINGER.
GEORGE PINKHAM.
WILLIAM FRIEGEL.